United States Patent [19]
Nyman

[11] Patent Number: 5,943,048
[45] Date of Patent: Aug. 24, 1999

[54] METHOD AND APPARATUS FOR TESTING A GRAPHIC CONTROL AREA

[75] Inventor: Noel Nyman, Seattle, Wash.

[73] Assignee: Microsoft Corporation, Redmond, Wash.

[21] Appl. No.: 08/974,636

[22] Filed: Nov. 19, 1997

[51] Int. Cl.⁶ ............................................... G06F 7/00
[52] U.S. Cl. .......................... 345/334; 345/339; 395/703
[58] Field of Search .................................. 345/333, 334, 345/339, 354; 395/701, 704, 703

[56] References Cited

U.S. PATENT DOCUMENTS

| | | |
|---|---|---|
| 4,230,990 | 10/1980 | Lert, Jr. et al. .................... 382/218 |
| 4,860,114 | 8/1989 | Horikawa et al. .................. 358/426 |
| 5,537,630 | 7/1996 | Berry et al. ......................... 345/335 |
| 5,596,714 | 1/1997 | Connell ................................. 714/46 |

*Primary Examiner*—Raymond J. Bayerl
*Assistant Examiner*—Cao H. Nguyen
*Attorney, Agent, or Firm*—Leydig, Voit, Mayer, Ltd.

[57] ABSTRACT

A method and system for automated testing of a graphic control area, such as a toolbar, displayed by an application, by randomly clicking on the graphic control area. The location of the graphic control area in the application window is identified to a test program by specifying the position of a reference line passing through graphic control area. The test program randomly chooses a test point on the reference line and clicks at the test point to trigger the response of the application under test.

17 Claims, 3 Drawing Sheets

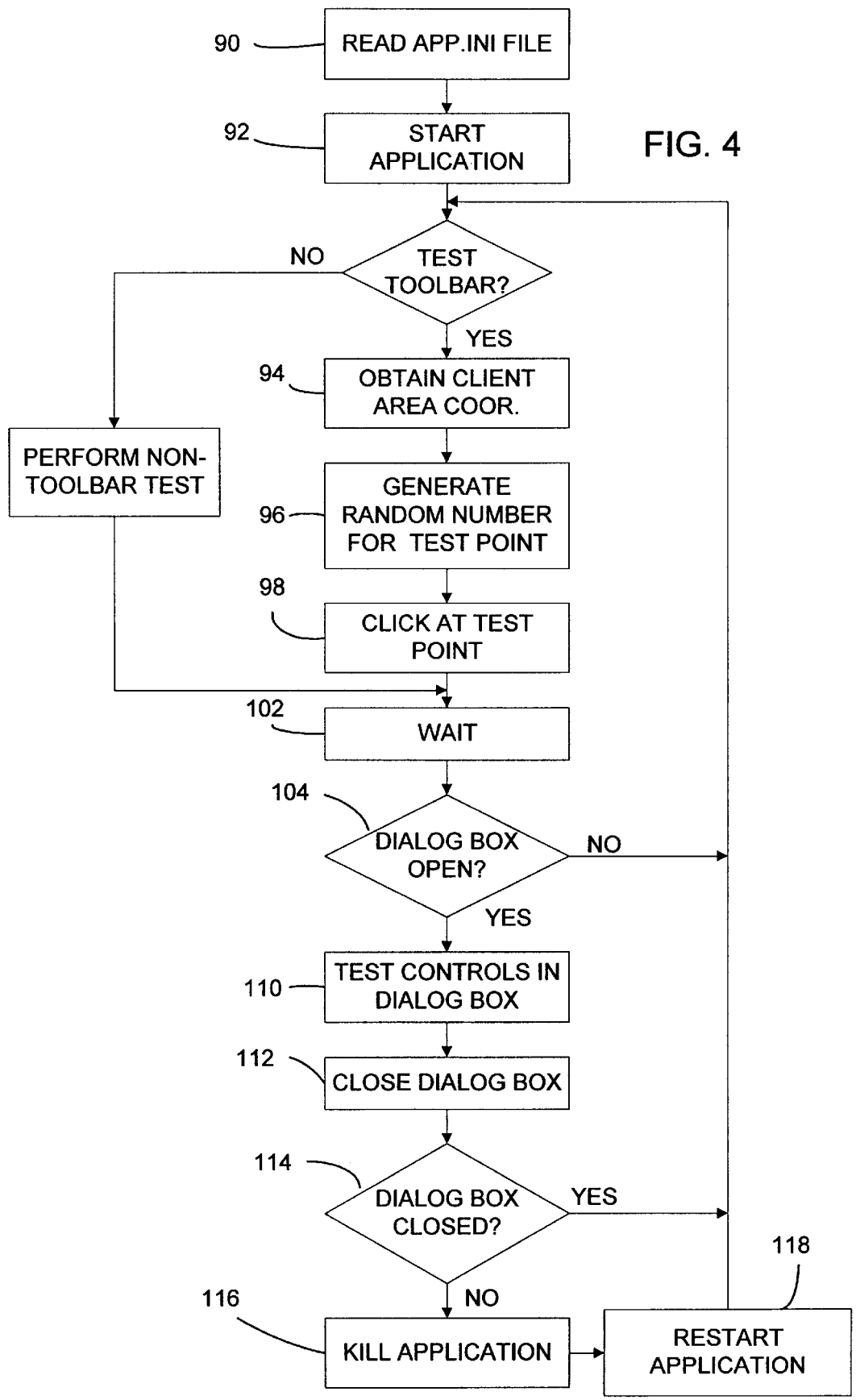

METHOD AND APPARATUS FOR TESTING A GRAPHIC CONTROL AREA

FIELD OF THE INVENTION

This invention relates generally to the testing of software applications, and more particularly to the testing of graphic user interface control items displayed by software applications.

BACKGROUND OF THE INVENTION

Developers of a computer operating system often use software applications as test engines to find errors, which are commonly called "bugs," in the operating system. Some of the applications make unusual use of functions in the operating system and may lead to the discovery of interesting bugs in the operating system. Testing the applications can also lead to discovery of bugs in the applications.

Because of the large number of applications developed for an operating system, there are many more applications than can be tested manually by human testers. For this reason, test programs have been developed to automate testing of applications. A special group of test programs has been developed. Those test programs are commonly called "monkeys" due to the ways they act on the control items provided by an application. Analogous to a monkey randomly pounding the keys of a typewriter, a "monkey" test program performs common user actions, such as choosing menus, clicking on option buttons, entering characters in edit boxes, etc., in an arbitrary fashion. Because the monkey test programs often do things generally not expected from real users, they may find bugs that are hard to discover otherwise.

To test the control items of an application, a test program has to know at least how to select the control items to trigger the responses of the application. If the graphic control items displayed by the application are implemented using the graphic user interface control library of the operating system, the test program can obtain information regarding the locations and types of the control items to determine where and how to operate on the control items. Many applications, however, have custom control items which are not implemented in the standard way. For example, some applications display toolbar-like controls that are actually bitmap images drawn by the application in the client area of the application window instead of separate controls defined by the operating system. In such a case, the test program may not even recognize the existence of such non-standard graphic control items, and, as a result, cannot test them.

SUMMARY OF THE INVENTION

In accordance with the present invention, there is provided a method and system for the automated testing of a graphic control area displayed by an application. The location of the graphic control area in the window of the application is identified to a test program by specifying the position of a reference line passing through the graphic control area. The test program then randomly selects a test point on the reference line, such as by clicking a mouse button at the test point, to trigger a response of the application. By specifying a reference line to the test program for identifying the location of the graphic control area, the test program can test the graphic control area even if the graphic control area is implemented in a way not recognized by the test program.

Other advantages will become apparent with reference to the following detailed description when taken in conjunction with the drawings.

BRIEF DESCRIPTION OF THE DRAWINGS

FIG. 4 is a flowchart-like diagram illustrating the operation of a test program for testing a graphic control area of an application.

Figure 1:
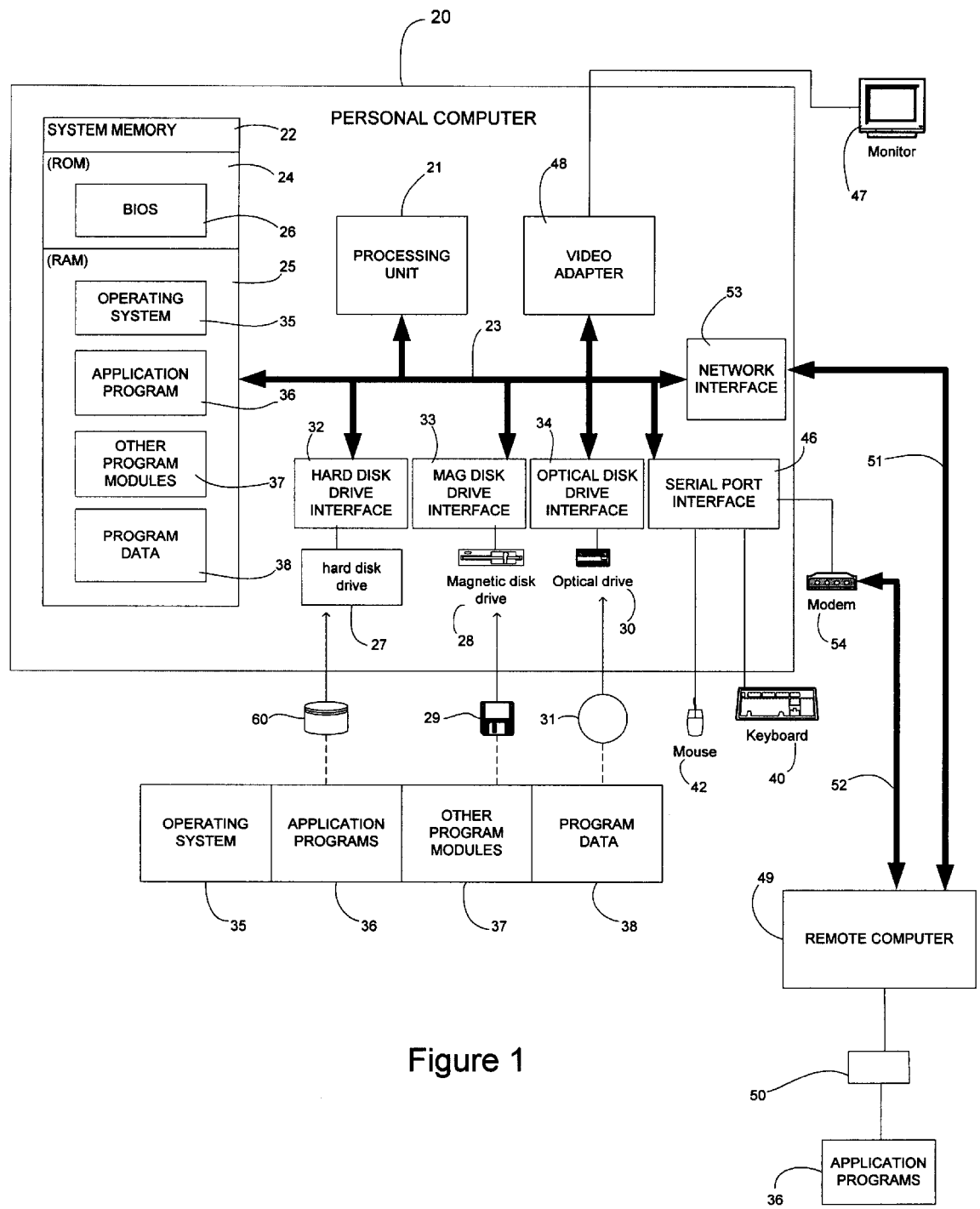
FIG. 1 is a block diagram of an exemplary computer system that may be used to implement a method and system for testing a graphic control area displayed by an application according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 and the following discussion are intended to provide a brief, general, description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24.

The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is generally directed to the automated testing of a software application by selecting or otherwise acting on the graphic user interface (GUI) control items provided by the application, and more particularly to the use of a test program to test a graphic control area displayed by the application by selecting or otherwise acting on one or more test points in the graphic control area to trigger responses of the application. The term "graphic control area" as used herein refers to an area in the application window where graphic control items are displayed (typically in a linear fashion, such as in a row or a column), wherein a user may select a control item by selecting a point within the graphic control item, such as by clicking the button of a mouse or an equivalent selection device. For illustration purposes, toolbars are used in the following detailed description as an example of graphic control areas. It will be appreciated by those skilled in the art, however, that the present invention is not limited to toolbars but can be used to test other types of graphic controls. For instance, the graphic control area may be a custom manual bar or one of many different types of custom graphic control interface features.

Figure 2:
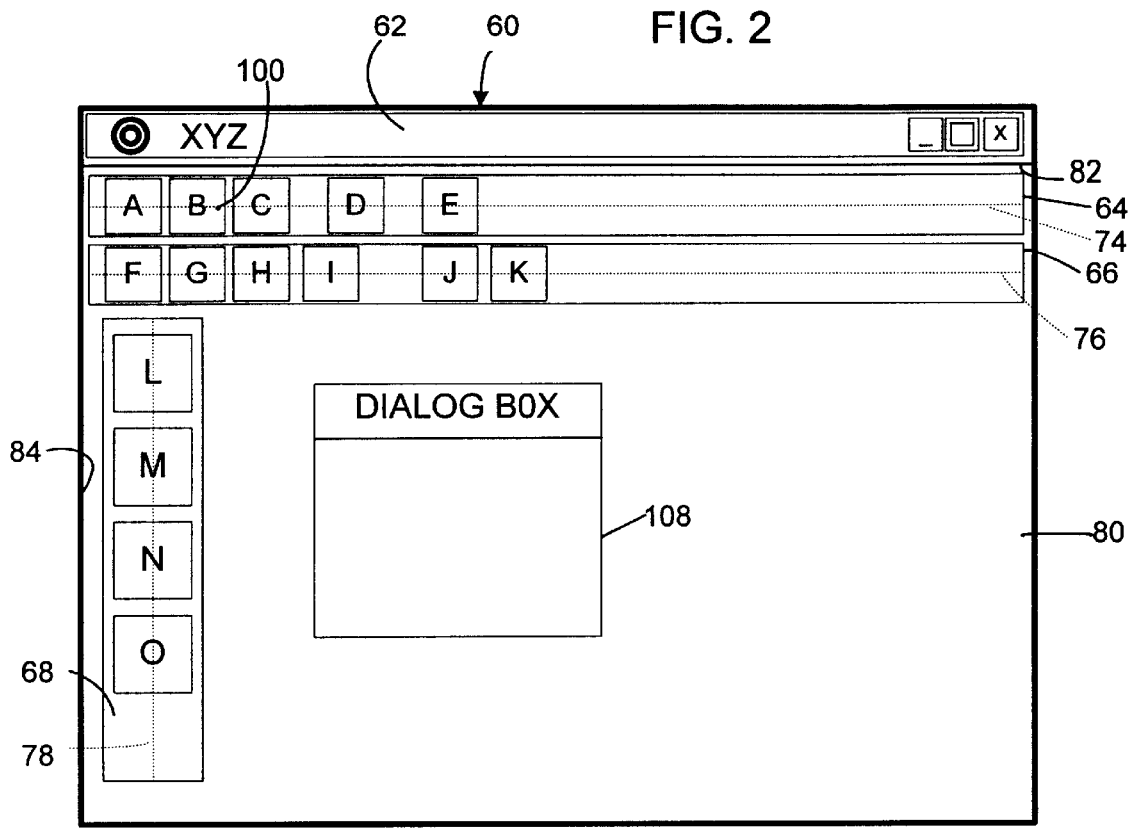
FIG. 2 is a schematic view of an application window with toolbars displayed therein.

FIG. 2 shows, as an example, a window 60 displayed on the video monitor 47 (FIG. 1) for an application entitled "XYZ" as indicated in the title bar 62 of the window. The window 60 contains three toolbars 64, 66, 68. A toolbar typically contains selection buttons for commonly requested menu commands and program options. Toolbar buttons are typically graphic objects drawn using a bitmap, and each button may contain an image and/or a text label designed for identifying the function of that button. For simplicity of illustration, the buttons in the three toolbars 64, 66, and 68 shown in FIG. 2 are labeled by letters A-O, respectively.

Figure 3:
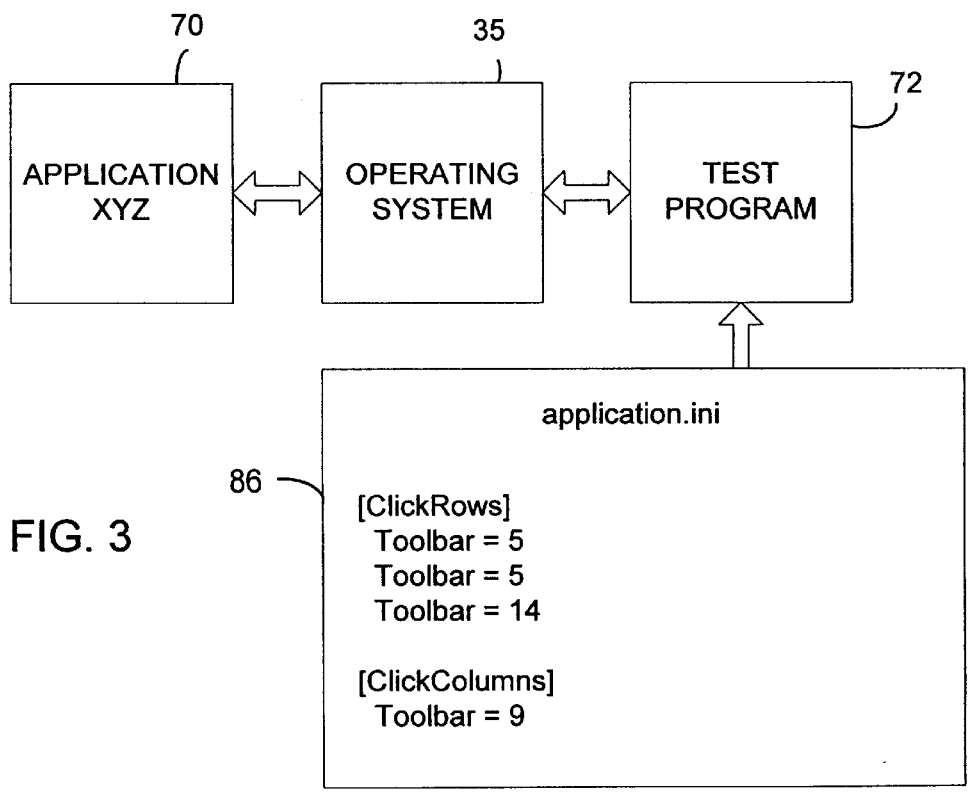
FIG. 3 is a block diagram showing a test program interacting with an application under test.

Turning to FIG. 3, the application XYZ 70 is tested by a test program 72 which interacts with the application through the operating system 35 to select or otherwise act on control items provided by the application. Generally, if the graphic controls of the application 70 are implemented using the control library of the operating system 35, the test program 72 can obtain the parameters for the controls to identify the locations and types of the control items. Many applications, however, create graphic user interface features that are non-standard, i.e., they are not implemented with functions provided by the standard control library of the operating system. For instance, the toolbars in some applications are bitmap images drawn by the applications in the client areas instead of separate control windows supported by the operating system. In such a case, the test program 72 often cannot by itself recognize the existence of those non-standard control items and therefore cannot effectively test them.

The present invention provides a simple, easy to implement, and flexible way to test such non-standard user interface features. In accordance with the invention, the general location of a graphic control area is identified to the test program 72 by specifying the position of a reference line passing through the graphic control area. The reference line preferably goes through the center of the graphic control area. For example, as shown in FIG. 2, the positions of the centerlines 74, 76, and 78 of the toolbars 64, 66, and 68, respectively, are provided by the user to the test program. In this way, even if the test program cannot "see" the toolbars, it can nevertheless click in the relevant regions in the application window to try to trigger responses from the application.

In the preferred embodiment, the position of the centerline of a graphic control area is specified by the separation or distance of the centerline from the boundary of the client area 80 of the application window 60. The client area 80 is the part of the total application window on which a program is free to draw and deliver visual information to the user and typically does not include the title bar 62 or the window sizing border. In the preferred embodiment, the position of the centerline of a horizontal graphic control area is given as the percentage of the total client area height from the top 82 of the client area 80. Similarly, the position of the centerline of a vertical graphic control area is given as the percentage of the total client area width from the left edge 84 of the client area 80. For example, the position of the centerline 74 of the toolbar 64 is given as 5% of the client area height from the top, and the position of the centerline 78 of the toolbar 68 is given as 9% of the client area width from the left edge. For high-resolution images, the distance between the centerline and the client area boundary may be specified at a higher resolution, such as a fraction of one percent of either the height or the width. It will be appreciated by those skilled in the art that there are many other ways to specify the location of a graphic control area that can be used without deviating from the sprit and scope of the invention.

Turning back to FIG. 3, in the preferred embodiment, the positions of the centerlines of the graphic control areas drawn by the application to be tested are stored in a file 86 which is named "application.ini" in FIG. 3. This file is created by the user to provide instructions to the test program as to how the application should be tested. As illustrated in FIG. 3, the line "Toolbar=5" under the heading [ClickRows] indicates that there is a horizontal toolbar centered around 5% of the total client area height from the top of the client area. Similarly, the line "Toolbar=9" under the heading [ClickColumns] indicates that there is a vertical toolbar at a distance of 9% of the client area width from the left edge of the client area. The relative frequencies at which the toolbars are to be tested can also be specified. In the illustrated embodiment, the line "Toolbar=5" appears twice in the application.ini file while the line "Toolbar=14" appears only once. This instructs the test program that the toolbar at 5% of the client area height is to be tested twice as many times as the toolbar at 14% of the client area height.

With reference to FIGS. 2, 3, and 4, to test the application 70, the test program 72 is first run on the test computer. The test program 72 reads the application.ini file 86 to obtain instructions for testing the application (step 90), including the positions of the centerlines of the toolbars. The test program then starts the application to be tested (step 92) and begins the testing.

When a toolbar is to be tested, the test program obtains the location and size of the client area of the application window from the operating system (step 94). The test program then randomly chooses a test point on the centerline of the toolbar for testing (step 96).

By way of example, for the horizontal toolbar 64, a test point 100 is determined by generating a random number r in the range between n and (w-n), where n is a small integer such as 5, and w is the width of the client area 80 in terms of pixels. The number n is chosen to ensure that the test point does not fall on the border lines of the client area. The x coordinate of the test point 100 is then determined as (r+$X_L$), where $X_L$ is the x coordinate (in pixels) of the left edge 84 of the client area. The y coordinate of the test point 100 is determined as ((p*h)+$Y_T$), where p is the percentage specifying the position of the centerline 74 of the toolbar 64, h is the height of the client area 80, and $Y_T$ is the y coordinate of the top edge 82 of the client area. For vertical toolbars, the coordinates of a test point can be determined in an analogous way.

After the coordinates of the test point are determined (step 98), the test program 72 provides a selection signal to the application 70 being tested to select the test point 100 as defined by the calculated coordinates. The selection signal is the same as would be generated by the operation of a regular selection device, such as a click of the mouse button, at the calculated coordinates. If the test point 100 falls on a control button (the button B in the illustration) in the toolbar 64 displayed by the application, the application is likely to respond to the "clicking" at the test point. After selecting the test point 100, the test program waits for a pre-selected period of time to receive any response from the application 70 (step 102). Subsequent testing by the test program depends on the response of the application. It will be appreciated that the test program does not have to know how the application being tested may respond to the clicking at the selected test point. Moreover, the clicking may not cause any response. For instance, if the selected test point falls between the buttons D and E of the tool bar 64 in FIG. 2, the application being tested may not provide any response.

In an exemplary embodiment, if the clicking does not cause a dialog box or the like to be opened (step 104), the test program moves on to another test, which may select the same centerline of the toolbar at another test point, a point on the centerline of another toolbar, or any other type of control provided by the application. On the other hand, if it is determined that the application opens a dialog box 108 in response to the clicking in the toolbar (step 104), the test program tests the different types of controls in the dialog box (step 110). For simplicity of illustration, the dialog box 108 in FIG. 2 is depicted without any control items shown therein. Nevertheless, it will be appreciated by those skilled in the art that many different types of control items may be included in a dialog box. Those controls include, for example, tab controls, check boxes, combo boxes, edit boxes, headers, list boxes, option buttons, scroll bars, sliders, spin controls, and tree views, etc.

After the testing of the controls in the dialog box 108 is finished, the test program then tries to close the dialog box (step 112). If test program is unable to close the dialog box (step 114), it kills the application (step 116) and restarts the application (step 118) for further testing.

It can be appreciated from the foregoing detailed description that the invention provides a simple, easy to implement, and flexible way to allow a test program to test graphic control areas that are not implemented with the standard user interface control library provided by the operating system. By identifying a reference line for each of the graphic control areas in an initiation file for the test program, the user can quickly instruct the test program to test custom control items displayed by the application that otherwise would not be recognized and tested by the test program.

What is claimed is:

1. In a computer system having a graphic user interface, a method of testing a graphic control area displayed by an application, comprising the steps of:

identifying a location of the graphic control area in a window of the application by receiving a specification of a position of a reference line passing through the graphic control area;

randomly choosing a test point on the reference line for testing; and providing a selection signal to the application to select the test point on the reference line to trigger a response of the application.

2. The method of claim 1, wherein the graphic control area is a toolbar.

3. The method of claim 2, wherein the toolbar is a bitmap image drawn in a client area of the window of the application.

4. The method of claim 1, wherein the position of the reference line is specified by indicating a separating of the reference line from a boundary of the client area in the window of the application.

5. The method of claim 4, further including the step of obtaining the locations of the boundary of the client area for determining coordinates of the test point.

6. The method of claim 5, wherein the separation is indicated as a portion of a dimension of the client area.

7. The method of claim 1, wherein the graphic control area is elongated in a horizontal direction.

8. The method of claim 1, wherein the graphic control area is elongated in a vertical direction.

9. The method of claim 1, wherein the step of identifying includes reading a file containing the specification of the location of the reference line.

10. The method of claim 1, wherein the reference line is a centerline through the graphic control area.

11. A system for automated testing of a graphic control area displayed by an application which utilizes a graphic user interface, comprising:

a video display for displaying a window of the application containing the graphic control area;

a memory for storing a specification of a position of a reference line which passes through the graphic control area;

a test program having means for reading the specification of the position of the reference line, means for generating a random number designating a test point on the reference line, and means for providing a selection signal to the application to select the test point for triggering a response of the application.

12. The system of claim 11, wherein the graphic control area is a toolbar.

13. The system of claim 11, wherein the reference line is a centerline of the graphic control area.

14. The system of claim 11, wherein the position of the reference line is stored in the memory as a separation of the reference line from a boundary of a client area in the window of the application.

15. The system of claim 14, wherein the separation is indicated as a portion of a dimension of the client area.

16. The system of claim 11, wherein the graphic control area is elongated in a horizontal direction.

17. The system of claim 11, wherein the graphic control area is elongated in a vertical direction.

* * * * *

UNITED STATES PATENT AND TRADEMARK OFFICE
CERTIFICATE OF CORRECTION

PATENT NO.   : 5,943,048  
DATED        : August 24, 1999  
INVENTOR(S)  : Noel Nyman Page 1 of 1

It is certified that error appears in the above-identified patent and that said Letters Patent is hereby corrected as shown below:

<u>Column 5,</u>  
Line 56, "$(r + X_L)$" should read -- $(r + x_L)$ --  
Line 57, "$X_L$" should read -- $x_L$ --  
Line 59, "$((p*h) + Y_T)$" should read -- $((p*h) + y_T)$ --  
Line 61, "$Y_T$" should read -- $y_T$ --

Signed and Sealed this

Eighth Day of January, 2002

*Attest:*

JAMES E. ROGAN  
*Attesting Officer*  *Director of the United States Patent and Trademark Office*